No. 813,925. PATENTED FEB. 27, 1906.
D. E. SUMMERS.
HAY STACKER.
APPLICATION FILED APR. 21, 1905.
2 SHEETS—SHEET 1.
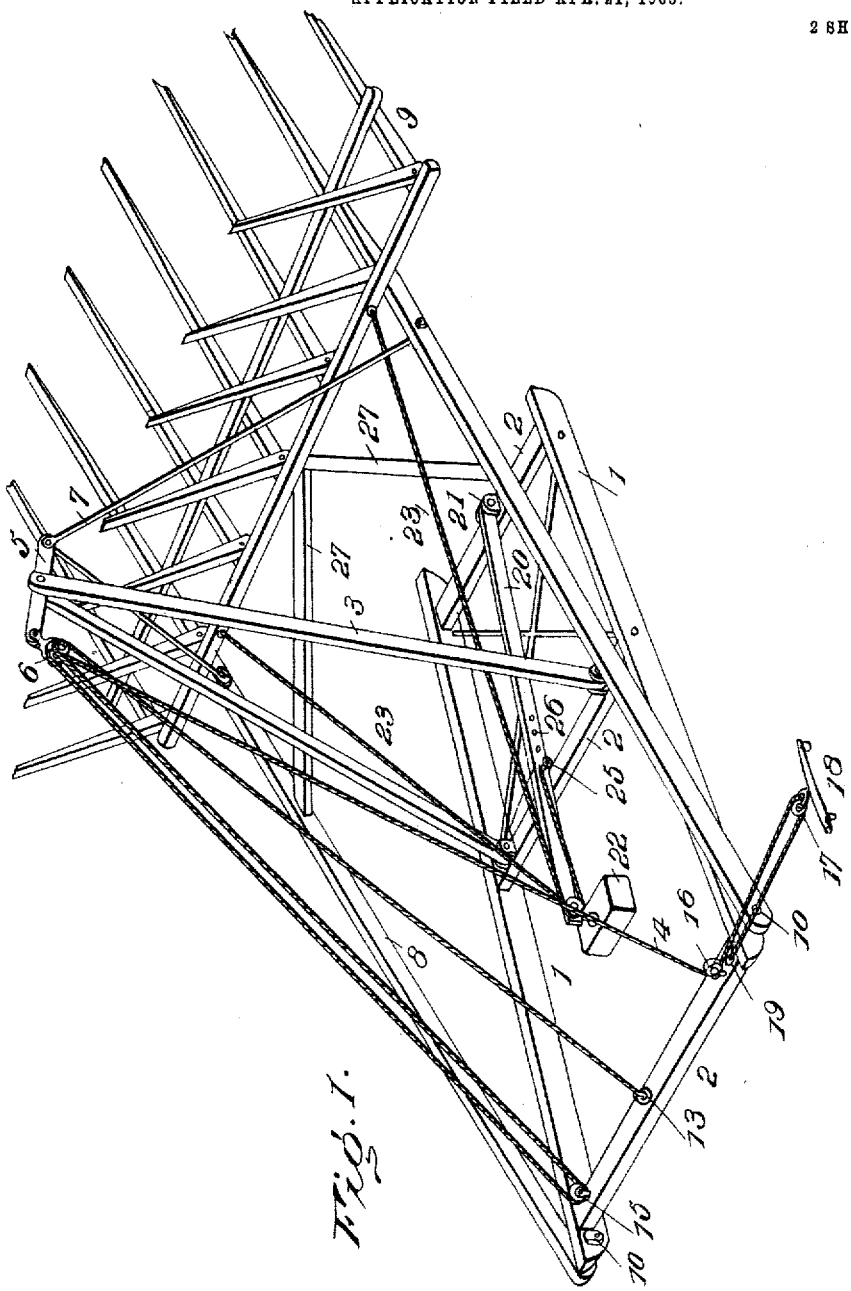

No. 813,925.
PATENTED FEB. 27, 1906.
D. E. SUMMERS.
HAY STACKER.
APPLICATION FILED APR. 21, 1905.
2 SHEETS—SHEET 2.
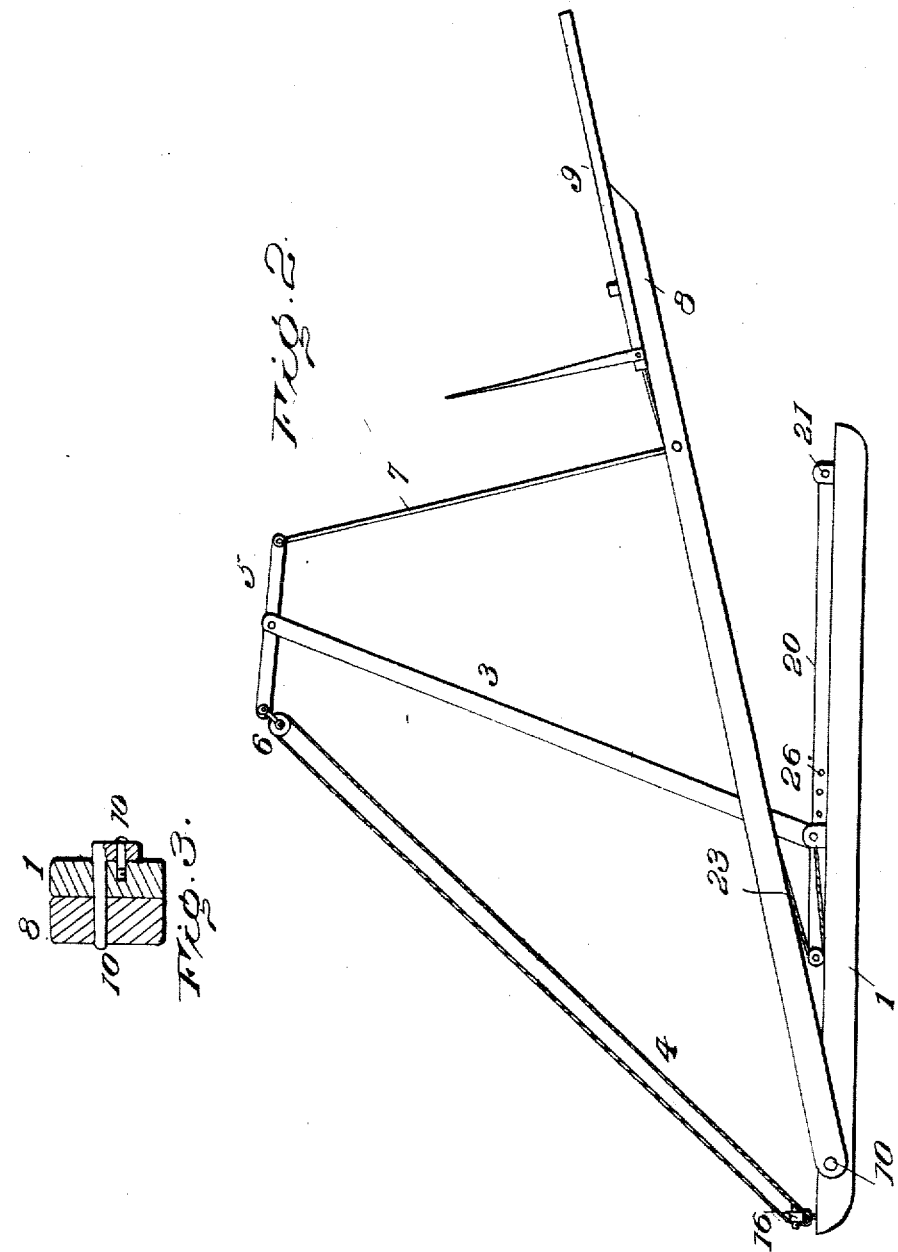
Witnesses
Inventor
D. E. Summers
By Lacey, Attorneys

UNITED STATES PATENT OFFICE.

DANIEL E. SUMMERS, OF MERCER, MISSOURI.

HAY-STACKER.

No. 813,925. Specification of Letters Patent. Patented Feb. 27, 1906.

Application filed April 21, 1905. Serial No. 256,748.

*To all whom it may concern:*

Be it known that I, DANIEL E. SUMMERS, a citizen of the United States, residing at Mercer, in the county of Mercer and State of Missouri, have invented certain new and useful Improvements in Hay-Stackers, of which the following is a specification.

This invention consists of an improved hay-stacker of that type embodying, essentially, a suitable horizontal base-frame, to which are pivoted arms carrying the hay-fork by which the hay is elevated and thrown upon the stack.

The invention utilizes a hoisting-frame which is peculiarly mounted so as not to weaken the supporting-frame; and a feature of the invention is comprised in the provision of the special form of evener-bar carried by the hoisting-frame, said evener-bar being operably connected with the supporting-frame of the fork and the hoisting-rope used for raising the fork. The evener-bar is designed to automatically adjust itself to variations in the level of the ground, and the invention includes also special means for retarding the upward movement of the fork and return the same after the hay has been delivered therefrom.

For a full description of the invention and the merits thereof and also to acquire a knowledge of the details of construction of the means for effecting the result reference is to be had to the following description and accompanying drawings, in which—

Figure 1 is a perspective view of a stacker embodying the invention. Fig. 2 is a side elevation. Fig. 3 is a detail sectional view showing the connecting member between one of the fork-arms and longitudinal sills.

Corresponding and like parts are referred to in the following description and indicated in all the views of the drawings by the same reference characters.

Describing the construction of the stacker, the numeral 1 designates the longitudinal sills composed in the supporting-frame structure, said longitudinal sills being connected at intervals in the length thereof by means of transverse bars 2. An intermediate transverse bar 2 carries the hoisting-frame 3, which is of approximately triangular form, similar to many of those at present in use. The sides of the frame 3 are pivotally mounted at the lower extremities thereof upon the bar 2 above mentioned, and this hoisting-frame is raised and lowered by means of a hoisting-rope 4, operably connected therewith. At the upper extremity of the hoisting-frame 3 is mounted an evener-bar 5, said bar being pivoted at a point between its ends to the hoisting-frame. The hoisting-rope 4 passes about a double pulley 6, connected by a clevis or like means to one end of the bar 5. The opposite end of the bar 5 is connected, by means of rods 7, with adjacent end portions of the spaced arms 8, carrying the fork 9. The spaced arms 8 are pivoted at one end, as shown at 10, to the sills 1 of the supporting-frame of the stacker, the opposite ends of the arms carrying the fork 9, which may be of any conventional and approved construction now in use. The pivots 10, which connect the arms 8 with the sills 1, are preferably of L shape, being bolted to the arms and passing through the sills and held in place by keys at the inner sides of the latter. The hoisting-frame 3 being pivoted upon the transverse bar 2 instead of upon the runners or sills 1 of the stacker does not necessitate the use of pivotal attaching devices carried by the members 1, the attachment of such devices weakening the runners often in a manner which is well known. The runners or sills 1 of the supporting or runner frame of the stacker converge toward the front ends thereof, so that when the arms 8 are at rest beside the runners waste hay is not likely to become wedged between the parts 8 and 1 and interfere with the proper working thereof. The hoisting-rope 4 is secured at one end to the rear bar 2 of the runner-frame, as shown at 13, said hoisting-rope extending from the point of attachment 13 about the double pulley 6, carried by one end of the evener-bar 5, thence extending downwardly around a pulley 15 near an end of the bar 2, to which said rope is attached, extending back around the pulley 6 again, thence to the bar 2 again under a third pulley 16. After passing beneath the pulley 16 the hoisting-rope passes about a pulley 17, attached to a swingletree 18 or similar draft means, the extremity of the rope adjacent the pulley 17 being attached also to the bar 2, as shown at 19. The arrangement and manner of connecting the hoisting-rope 4 with the various pulleys and the evener-bar is such that a maximum amount of power is obtained, and the draft animal or animals hitched to the swingletree 18 are not required to walk the distance required by the arrangement of the hoisting-ropes in most of the stackers at present in use.

The fork 9 is raised or elevated by the pull upon the hoisting-rope 4 in an obvious manner, and the rearward movement of the fork in delivering the hay is checked or retarded by a retarder-bar 20, which bar is pivoted at one end, as shown at 21, to the front cross-bar 2 of the runner-frame, the opposite end of the bar 20 having a weight 22 attached thereto. The end portion of the bar 20 adjacent the weight 22 is connected by connections 23 with the fork 9, said connections 23 being secured to the bar 20 by a longitudinally-adjustable member 25, which may be a pin or the like, adapted to engage in a selected one of a plurality of openings 26, formed longitudinally of said bar 20. The weight 22, carried by the bar 20, not only checks the delivery movement of the fork, but returns the fork to the ground after the hay has been delivered therefrom. The fork 9 is connected by suitable braces 27 with the arms 8, as shown most clearly in Fig. 1 of the drawings.

Having thus described the invention, what is claimed as new is—

1. In a hay-stacker, the combination of a supporting-frame, arms pivoted to the supporting-frame, a fork carried by said arms, a hoisting-frame, a hoisting-rope connected with the hoisting-frame, connecting means between the hoisting-frame and the arms carrying the fork, a pivoted weighted retarder-bar, a member adjustable longitudinally of said retarder-bar, and a connection between said adjustable member and the fork.

2. In a hay-stacker, the combination of a supporting-frame, arms pivoted to the supporting-frame, a fork carried by said arms, a hoisting-frame, a hoisting-rope connected with the hoisting-frame, connecting means between the hoisting-frame and the arms carrying the fork, a weighted retarder-bar pivoted to the supporting-frame of the stacker and provided longitudinally thereof with a plurality of openings, a pin insertible in a selected one of the openings in the retarder-bar, and a connection between said pin and the fork.

In testimony whereof I affix my signature in presence of two witnesses.

DANIEL E. SUMMERS. [L. S.]

Witnesses:
C. R. WELLS,
C. P. BELL.